United States Patent [19]

Nishikawa

[11] 4,415,982

[45] Nov. 15, 1983

[54] SCINTILLATION CAMERA

[75] Inventor: Mineki Nishikawa, Tochigi, Japan

[73] Assignee: Tokyo Shibaura Denki Kabushiki Kaisha, Kawasaki, Japan

[21] Appl. No.: 229,002

[22] Filed: Jan. 27, 1981

[30] Foreign Application Priority Data

Jan. 31, 1980 [JP] Japan .................................. 55-10244

[51] Int. Cl.³ ............................................. H04N 5/66
[52] U.S. Cl. ................................ 364/527; 250/363 S; 358/166; 378/99
[58] Field of Search ............... 364/527, 515, 571, 574; 250/363 S, 416 TV; 358/166, 110

[56] References Cited

U.S. PATENT DOCUMENTS

| | | | |
|---|---|---|---|
| 3,011,057 | 11/1961 | Anger. | |
| 3,717,763 | 2/1973 | Tanaka et al. | 250/71 |
| 3,860,822 | 1/1975 | Owens, Jr. | 250/363 S |
| 3,878,373 | 4/1975 | Blum | 364/571 X |
| 4,100,413 | 7/1978 | Inbar et al. | 250/363 S X |
| 4,223,353 | 9/1980 | Keller et al. | 250/363 S X |
| 4,223,388 | 9/1980 | Nishikawa et al. | 364/571 X |
| 4,258,428 | 3/1981 | Woronowicz | 250/363 S X |
| 4,261,040 | 4/1981 | Weidman et al. | 358/166 X |

FOREIGN PATENT DOCUMENTS 52-134588  3/1977  Japan.

Primary Examiner—Edward J. Wise
Attorney, Agent, or Firm—Finnegan, Henderson, Farabow, Garrett & Dunner

[57] ABSTRACT

A scintillation camera including a memory having a plurality of addresses corresponding to the elements of the matrix-like divided image of a scintigram and to the points in the camera head for registering radiation. The addresses in the memory are designated to correspond to incidence position signals of points of radiation determined by a position-calculating circuit. A pulse-height analyzer also receives the signals of radiation registered by the camera head and issues an unblanking signal to control apparatus if the signal is significantly stronger than background noise. The control apparatus, triggered by the unblanking signal, initiates the comparison of the content of the designated address in memory with a predetermined minimum value of radiation in a comparator and when the content is less than the minimum value the control apparatus adds one to the content and restores the increased content to the designated address. When the content is at least equal to the minimum value, the control apparatus issues the unblanking signal to display apparatus to display the radiation at the designated address. A timer stops access of the unblanking signals to the display apparatus after a preset time, thus excluding display at those elements of the display wherein the accumulated radiation is less than the minimum at the expiration of the preset time.

5 Claims, 5 Drawing Figures

: 1

SCINTILLATION CAMERA

BACKGROUND OF THE INVENTION

This invention relates generally to a scintillation camera utilized for nuclear medical diagnosis and, in particular, to a radiation distribution imaging apparatus for use in such a camera.

The scintillation camera is an apparatus with which, after radioactive material marked with a radioisotope is administered in the body of a patient, distribution of the radioactive material in the body is measured from the outside of the body to make an image for diagnosis. U.S. Pat. No. 3,717,763, of common assignee herewith, discloses such a camera.

In case of examination with the scintillation camera, the degree of accumulation of the radioactive material in specified organs, tissue or tumors of the patient contrasts with other portions of the body. In case the localized density ratio of radioisotope distribution in the patient is relatively large, the density ratio of scintigrams, which are sequentially made, become large in proportion to the distributions in other parts of the body, so that the analysis of the scintigrams can be easily performed. However, in some cases the localized density ratio of the radioisotope distribution in the patient is relatively small. For example, in the case that an examination for tumors is being performed, taking a characteristic of tumor affinity for gallium 67 (67GA), an accumulation ratio of the tumor portion to the normal portions of the body is about 10:9 7. Such a ratio is substantially the same as the normal density contrast ratio of the scintigram itself as provided by the scintillation camera. In fact, it must also be considered that the accumulation ratio, as shown, is a little lower than the actual accumulation ratio because of the influence of blur due to the resolution of the scintillation camera. In such a case, it is very difficult to identify tumors with reference to the obtained scintigram. So, it is strongly desired to obtain scintigrams which reflect identifiable density differences, i.e., that the actual differences be reflected and emphasized.

It has been long known to utilize a scintillation scanner in a nuclear image examination wherein a detector is adapted to scan one by one at measuring points of the patient's body. Therefore, it can easily perform, to a dot only, at the scanning points, which count value is over a predetermined discriminating count level. The density ratio of the radioisotope distribution can thereby be emphasized.

But in recent years the scintillation camera has been increasingly utilized because the scintillation scanner needs a long time for scanning and the resolution and the efficiency of the scintillation camera have overtaken and outrun those of the scintillation scanner. However, in scintillation cameras of the prior art, only one detector catches all of the effective visual field, and only from this one detector is the radioisotope distribution in the field displayed in its entirety. It has been known in the past to show only the parts of the display which exceed a predetermined discriminating level of the scintigram image data as obtained by the scintillation camera with a data processor utilizing a computer. However, the latter technique has shortcomings in that an expensive data processor is needed and the original resolution of the camera is impaired by a rough digitalizing of the obtained image data.

It is known, as taught in U.S. Pat. No. 3,717,763, referred to above, to analyze the pulse heights of radiation registered by the scintillation camera and to screen out radiation points which are no more intense than the background electronic noise. This is achieved by controlling access to each point of the display and issuing an unblanking signal by the pulse height analyzer as to that point when the signal from the camera head as to that point is acceptable.

SUMMARY OF THE INVENTION

It is accordingly a principal object of this invention to provide a scintillation camera, which produces scintigrams which emphasize differences in density substantially on real time without using an expensive data processor and without being essentially digitalized.

Briefly, this and other objects are achieved in accordance with a first aspect of the invention, by providing a scintillation camera, including a pulse height analyzer and a display device for reflecting the radiation registered by the camera, with a memory and associated circuitry. The memory has a plurality of addresses corresponding to the elements of the matrix-like image of the scintigram registered by the camera. The address designations of the memory are established on the basis of the radiation incidence position signal by a known position-calculating apparatus. The associated circuitry includes a control circuit, a comparator for individually comparing accumulated numbers of scintillations at the individual addresses in the memory with a predetermined minimum of radiation set in a digital switch, and a timer. A control apparatus triggered by an unblanking signal from the pulse height analyzer initiates the comparison, resulting in a first or second signal to the control circuit if the content of the individual address is less than, or at least equal to, respectively, the minimum.

Upon receipt of the first signal, the control circuitry adds one and restores the increased content to the designated address. Upon receipt of the second signal, the control circuitry clears the unblanking signal to the display apparatus as to that element of the display. After the expiration of a preset time, the control apparatus shuts off access of the unblanking signals to the display apparatus, thus blanking those elements of the display wherein the accumulation of radiation is less than the minimum at the expiration of the preset time.

DESCRIPTION OF THE PREFERRED EMBODIMENT

Figure 1:
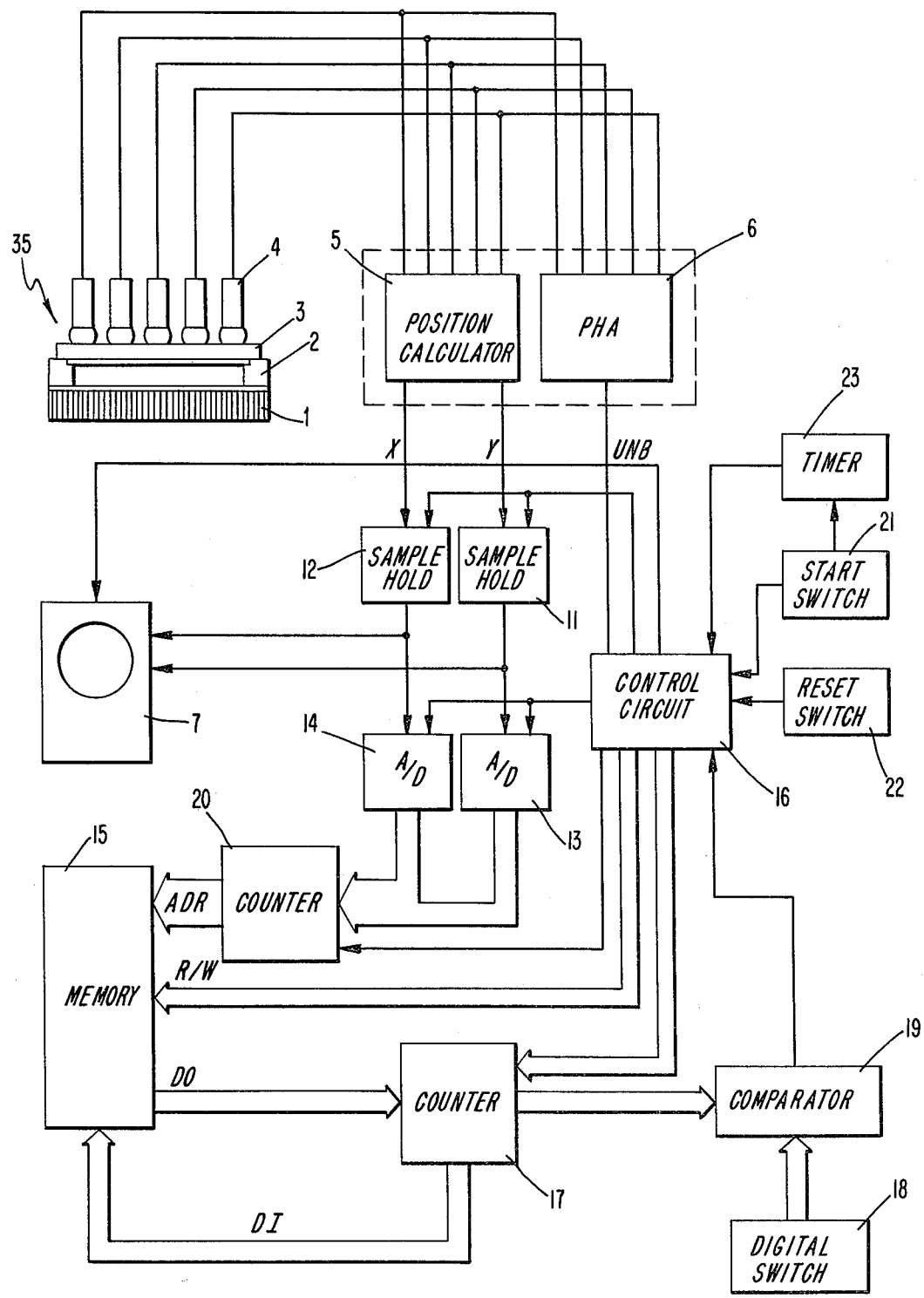
FIG. 1 is a schematic block diagram showing the structure of the preferred embodiment of this invention.

Referring now to FIG. 1, a camera head 35 includes a collimator 1, a scintillator 2, a light guide 3 and a plurality of photomultipliers 4. The collimator 1 receives radiation, for example, γ-rays, emitted in random directions, from radioisotope materials in a subject or a patient's body and passes through only radiation in a particular direction. Preferably, the collimator is of the type utilizing a matrix of small holes in a lead sheet of sufficient thickness to exclude γ-rays, except through the holes, as known in the art. There are also available in the art for special uses, pin hole collimators, converging collimators and diverging collimators or the like, the latter for extension of the image and visual field.

The scintillator 2 has the function of exchanging a photon of the emitted γ-rays into a plurality of visual photons. A single crystal of NaI(T1), usually used as the scintillator, has its light output surface sealed hermetically with borosilicate glass or the like. This process is called scintillation due to the generation of fluorescence by the radiation of the γ-rays absorbed in the scintillator.

The light guide 3 leads the scintillation from the scintillator to the plurality of photomultipliers 4 which receive the light on their cathode surfaces to convert the light into photoelectrons by an action of photoelectric conversion and to amplify the photoelectrons to form a pulse current. The photomultipliers are arranged in two dimensions on the light guide 3 which is disposed on the scintillator 2.

A position-calculating circuit 5 receives the outputs of the photomultipliers and then calculates the position generating the scintillation on the scintillator 2 with reference to the value of the outputs, generating coordinate signals X and Y, corresponding, respectively, to the coordinates of the position in which the scintillation was generated.

A pulse-height analyzer 6 measures the energy of the incident photon developed from the γ-ray from the sum total of each photomultiplier's output and judges whether it is an γ-ray having an extent of energy level greater than any background noise. Position-calculating circuits and pulse-height analyzers are well-known in the prior art.

Also, the pulse-height analyzer 6 generates unblank signals (UNB) synchronized with the signal X and the signal Y to depict a brighting spot in a display apparatus which conventionally comprises a cathode ray tube. Thousands to millions of the brighting spots (one brighting spot corresponds to one γ-ray quantum of incident radiation) are integrated to obtain an image for diagnosis which is generally called a scintigram.

The position signals X, Y from the position-calculating circuit are respectively sampled and the samples held by sample/hold circuits 11, 12. These sample/hold circuits may be provided with multiple buffer circuits in order to get a high count rate characteristic of the total system.

The position signals X, Y held in the sample/hold circuits 11 and 12 are applied to the deflection input terminals of a display apparatus 7 and are also applied to analog-to-digital convertors 13 and 14, respectively, to convert them into digital values of about six bits each. The desirability of six-bits will become apparent as the explanation proceeds. The digitalized signal X is set up as the leading six bits and the digitalized signal Y is set up as the trailing six bits of an address. The accumulated twelve-bit signal is supplied to a 4096 word memory 15 as the address-designating signal. The visual field of the scintillation camera is divided, therefore, into sixty-four areas in both the X and Y directions, that is, into a matrix of 64×64 image element regions each of which corresponds to a position in the memory 15.

Figure 2:
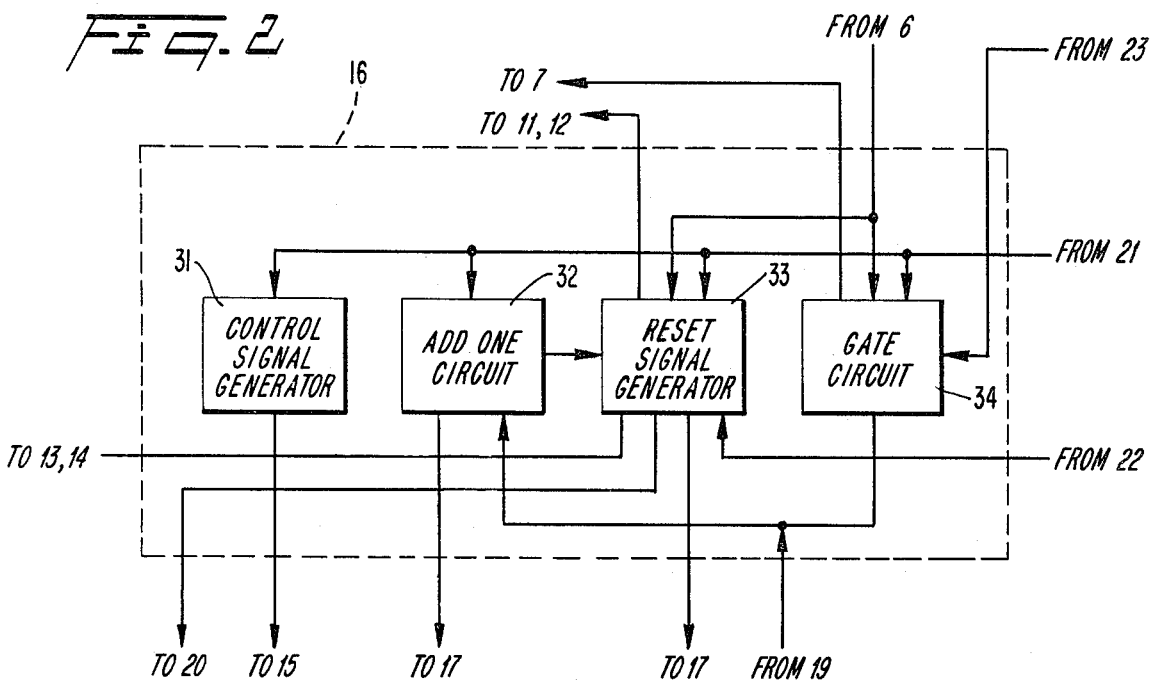
FIG. 2 is a schematic diagram showing portions of the control circuit of FIG. 1.

A control circuit 16 controls the sample/hold circuits 11,12, the analog-to-digital convertors 13,14, the memory 15, etc., and receives the unblank signals UNB from the pulse-height analyzer in a gate circuit 34 as shown in FIG. 2. Upon receipt of the UNB signal, the control circuit 16 issues a reading/writing signal R/W through control signal generator 31 to the memory 15.

The content of the designated address of the memory 15 is generated as a signal DO and set into a counter 17. The signal set into the counter 17 is then compared with a predetermined value set in a settable digital switch 18 for setting the discriminating level of radiation per image element region.

The comparator 19 generates two kinds of signals in accordance with the comparative result. That is, it generates a first signal when the content of the designated address of memory 15 is less than the discriminating level, and a second signal when former is at least equal to the latter.

The control circuit 16 receives these signals and, when receiving the first signal, adds a unit value, such as one, to the content of the memory by the add-one circuit 32 at the designated location, and restores the increased value at the designated location in memory. The gate circuit 34 receives the second signal, and in view of the unblank signal previously received, acts as an AND gate to pass the UNB signal on to the display apparatus.

A binary counter 20 of twelve bits supplies the address signal ADR to the memory 15. The counter 20 is set by the outputs of the analog-to-digital convertors 13,14 to generate, as before-mentioned, the address signal ADR to the memory 15, The counter 20 also clears the memory 15 by counting 0 to 4096 in reply to the signal from the control circuit 16 in the reset operating time generated by the reset signal generator 33. A start switch 21 and a reset switch 22 both act to clear memory 15 through the counter 20. A timer 33, for determining photographing time of the scintillation camera, is started by the start switch 21 and, when the preset time in the timer expires, transmits a signal to the control circuit 16 to stop access of the unblank signal UNB to the display apparatus 7.

We will now describe the operation of the above-mentioned construction.

Before taking a scintigram the reset switch 22 is closed to reset the counter 17 to zero through the control circuit 16. Then the control circuit 16 successively drives the memory 15 from address "0" through address "4096" by means of the counter 20 of twelve bits to clear the memory by writing "0" which is the content of the counter 17.

Next, the acquisition of data for a scintigram will begin by operating the start switch 21. At this time, the timer 23 which has previously been set in the optimum photographing time, for instance 140 seconds, is actuated, too. As the camera head 35 begins to generate electrical signals, they are received by both the position-calculator 5 and the pulse height analyzer 6. The X and Y coordinates of the first designated address are transmitted to the sample/hold circuits 11,12. The first signal received by the pulse height analyzer 6 is evaluated and, if the signal is of sufficient quality, an unblank signal is transmitted to the control circuit 16. The receipt of the unblank signal by the gate circuit 34 initiates the comparison process.

The signals, respectively, held by the sample/hold circuits 11,12 are applied to the display apparatus to wait for the unblank signal as known in the art. Meanwhile, coordinate position signals X,Y are, respectively, converted by analog-to-digital convertors to drive the memory 15 through the counter 20. The control signal R/W, in a reading mode, is generated by the control circuit and the content of the designated address in the memory 15, namely, zero as of the start, is set into the counter 17. The value set into counter 17 is compared in the comparator 19 with the discriminating level set by the digital switch 18. As it is necessarily less than the discriminating level at the start, the control circuit 16 counts up one as to the content of the counter 17 and the increased content is written into the memory 15 by changing the control signal R/W to writing mode, cancelling the hold of coordinate position signals X,Y to await the following input signal without transmitting the unblank signal UNB to the display device. When a second signal is received for the same designated position, the described operation is repeated and if, during the alloted time, sufficient radiation is received as to a specific location, the content of the designated location in memory as reflected in the content of the counter 17 will equal the discriminating level. At this juncture the display apparatus is unblanked as to that position and the sample/hold circuits are vacated to await the following signal.

As a result of the apparatus of the invention, the radiation at each address of the memory is counted up upon occurrences of scintillations in the corresponding position in the camera and in cases when the counting value in the memory address is less than the discriminating level, the unblank signals are not supplied to the display apparatus 7; that is, the image element corresponding to the memory address is not depicted in the display apparatus 7. When the counting value in the memory address is equal to the discriminating level, for the first time, the unblank signal is supplied to the display apparatus 7 to depict the image element in the display apparatus 7.

Figure 3:
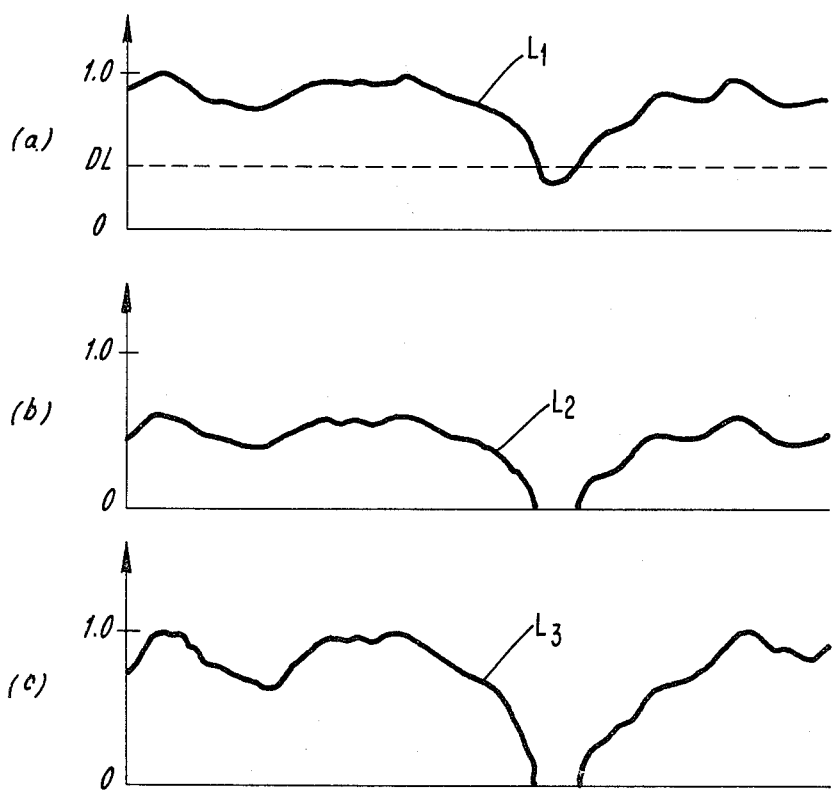
FIGS. 3(a) through (c) are graphic representations of assistance in explaining the operation of the invention.

The above-mentioned operation is continued until the photographing time set by the timer 23 expires. That is, when the end of the photographing time comes, a signal is generated from the timer 23 to turn off the gate circuit 34 of the control circuit 16 and to completely check the access of unblank signals to the display apparatus 7. In other words, this period of photography by the scintillation camera is finished. In this case, on consideration of the discriminating level $DL_1$ in FIG. 3, the bright spot is not displayed in the address region having datum value which does not reach the level $DL_1$, while the bright spot is displayed in the other address regions. Referring now to FIG. 3 (a) through (c), it will be explained why restriction of the display to values equal to or above the discriminating level emphasizes the density ratio of the image.

A curve $L_1$ shown in FIG. 3 (a) designates the radioisotope density distribution on each point of the scanning position (the lateral axis) and a dotted straight line DL designates the predetermined discriminating level. A curve $L_2$ shown in FIG. 3 (b) designates the density distribution of the scintigram which is generated by the camera utilizing the discriminating level DL, with the discriminating level placed on the x-axis. A curve $L_3$ shown in FIG. 3 (c) shows the density distribution of the scintigram which is generated when, as to the curve $L_2$ in FIG. 3 (b), the discriminating level is held on the x-axis, but the peak of the curve $L_2$ is set at one to perform a normalization as well known in the art. As easily understood in reference to FIG. 3, as for the address data having a counting value which exceeds the discriminating level, the curve $L_2$ is extended upward and downward to deform to the curve $L_3$, acquiring the image emphasized difference of density. Although the higher the discriminating level is set, the stronger the difference of density is emphasized, emphasis of the density difference is achieved at any discriminating level.

Also, in this case, the scintigram which is generated on the radiation of the regions equal to or exceeding the discriminating level have almost no loss due to digitalization because data before digitalizing are used as position signals for the display apparatus 7, and the inherent solution of the scintillation camera and the collimator is not substantially impaired by digitalization. In addition, the scintigram of the invention which emphasizes the density distribution is generated substantially on real time.

What we claim is:

1. A scintillation camera apparatus including a camera head for detecting, in a matrix of points, radiation emitted from radioactive materials distributed in a subject and generating electric signals corresponding with said emitted radiation, said camera including a collimator, a scintillator, and a plurality of photomultipliers, position-calculating apparatus for calculating the radiation incidence position of an electric signal from said camera head, a pulse-height analyzer for generating an unblanking signal only when the emitted radiation exceeds background noise and display apparatus for reflecting the electric signals generated by the camera head, the improvement comprising:

a memory having a plurality of addresses corresponding to the points of the matrix detected by said camera head;

an address-designating apparatus supplied with the radiation incidence position from the position-calculating apparatus for issuing a signal designating the address in said memory corresponding to each radiation incidence position signal received and for driving the memory position to a successive position;

control apparatus;

means for transmitting said unblanking signal to said control apparatus;

means triggered by the receipt of said unblanking signal by said control apparatus for comparing the content at the address designated by the address-designating apparatus with a predetermined minimum of acceptable radiation, said comparing means generating a first signal representing that said content of the memory at the designated address is less than said predetermined minimum value and a second signal representing that said content is at least equal to said predetermined minimum value;

means for transmitting said first and second signals from said comparing means to said control apparatus, said control apparatus, (1) upon receipt of said first signal, adding one, representing said received designation signal, to said content and returning the increased content to the designated address, and, (2) upon the receipt of the second signal, issuing the unblanking signal to said display apparatus at the corresponding point of the display apparatus; and timing means for shutting off access of said unblanking signals to said display apparatus at a predetermined time, whereby said display apparatus reflects only radiation at least equal to said predetermined minimum at said predetermined time.

2. The improvement in scintillation camera apparatus according to claim 1 wherein said comparing means includes a comparator having one input from said memory and a second input from a presettable digital switch for establishing said predetermined minimum value.

3. The improvement in scintillation camera apparatus accoding to claim 2 wherein said address-designating apparatus comprises at least one sample/hold circuit for receiving the radiation incidence position signal of the position-calculating apparatus, an analog-to-digital converter for converting the signal held by the sample/hold circuit to a digital signal and a counter for receiving the digital signal and generating the address-designating signal to the memory.

4. The improvement in scintillation camera apparatus according to any one of claims 1 through 3 also including a starting switch for supplying the starting signal to the control signal.

5. The improvement in scintillation camera apparatus according to any one of claims 1 through 3, also including a resetting switch for supplying a resetting signal to the control circuit.

* * * * *